United States Patent [19]

Semmes et al.

[11] 3,774,871

[45] Nov. 27, 1973

[54] EXTERNAL SLURRY INJECTION FOR INFRARED ENHANCEMENT OF EXHAUST PLUME

[75] Inventors: Ignatius W. Semmes, Fort Walton Beach; Charles B. Simpson, Mary Esther, both of Fla.

[73] Assignee: The United States of America as represented by the Secretary of the Air Force, Washington, D.C.

[22] Filed: Apr. 30, 1970

[21] Appl. No.: 33,461

[52] U.S. Cl. ............... 244/136, 239/311, 239/171
[51] Int. Cl. ............................................. B64d 1/18
[58] Field of Search ................... 239/418, 433, 369, 239/368, 317, 311, 171; 244/73, 74, 130, 53, 244/136; 60/264; 102/87; 149/87

[56] References Cited
UNITED STATES PATENTS

| 3,430,446 | 3/1969 | McCloy | 244/15 X |
| 3,243,326 | 3/1966 | White et al. | 149/87 X |
| 860,419 | 7/1907 | Stafford | 239/311 |
| 3,121,639 | 2/1964 | Bauer et al. | 239/418 X |
| 2,743,134 | 4/1956 | Smith | 239/311 |
| 2,946,185 | 7/1960 | Bayer | 239/433 X |
| 3,289,409 | 12/1966 | Schirmer | 60/264 X |

*Primary Examiner*—M. Henson Wood, Jr.
*Assistant Examiner*—John J. Love
*Attorney*—Harry A. Herbert, Jr. and Arsen Tashjian

[57] ABSTRACT

A means for enhancing the infrared content of the exhaust plume of a rocket-powered target vehicle by controllably atomizing and injecting an enriching slurry into the main exhaust flow thereby producing an output which realistically simulates the radiant intensity pattern produced by an afterburning aircraft.

3 Claims, 7 Drawing Figures

PATENTED NOV 27 1973 3,774,871
SHEET 1 OF 2
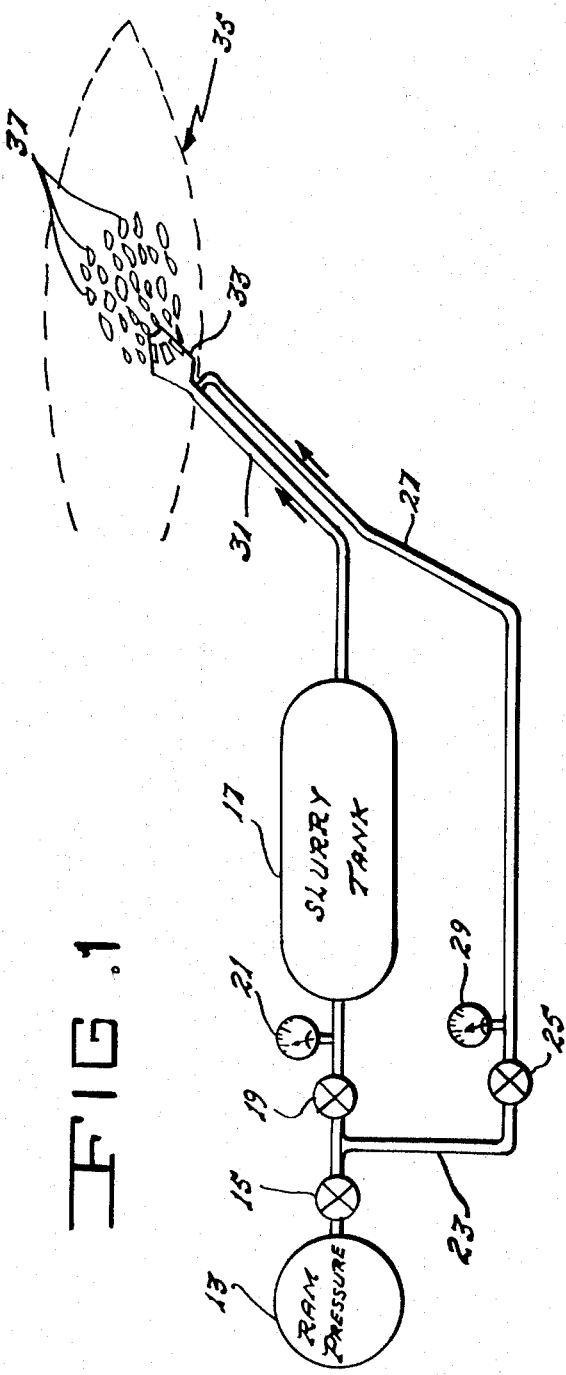
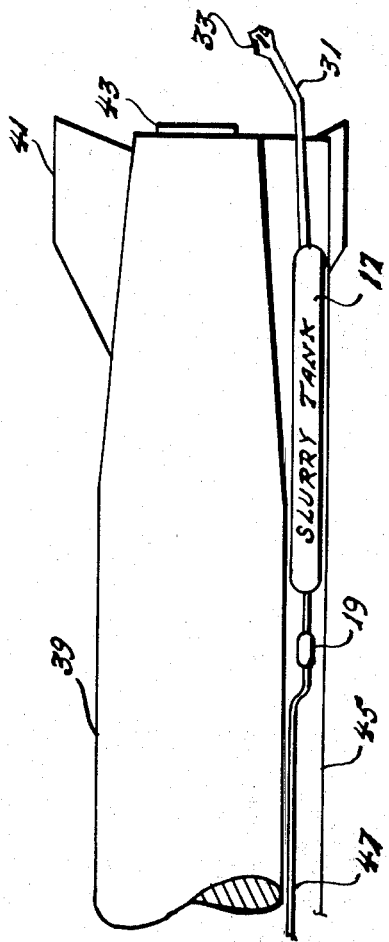
INVENTORS.
IGNATIUS W. SEMMES,
CHARLES B. SIMPSON
BY Harry A. Herbert Jr.
Orsen Tashjian
ATTORNEYS

INVENTORS.
IGNATIUS W. SEMMES
CHARLES B. SIMPSON

EXTERNAL SLURRY INJECTION FOR INFRARED ENHANCEMENT OF EXHAUST PLUME

BACKGROUND OF THE INVENTION

This invention relates to a means for enhancing the radiant intensity of a rocket-powered target source to simulate an afterburning aircraft and, more particularly, the invention is concerned with providing a device for augmenting the plume of a target vehicle by controllably atomizing an enriching slurry and injecting it into the main exhaust flow.

The tendency in recent times has been to supplement radar detection and guidance systems with ones which utilize infrared radiation sensitive equipment. In the testing of infrared aircraft detection and tracking devices, it is necessary to provide a source of radiation in the infrared spectrum, particularly for the purpose of training personnel in the use of weapons and equipment having infrared sensitive homing mechanisms. In many applications, such as instrument calibration, aircraft tracking, infrared simulators, targets and the like, it is desirable to have a radiation source wherein the type and amount of energy emitted is comparable to a fighter aircraft with afterburner in the active mode.

Heretofore, the only realistic simulant of afterburning threat aircraft is the droned afterburning aircraft. Since these drones are highly expensive for actual missile firings, powered target missiles are utilized largely for maneuvering air-to-air missile evaluation. However, the presently available target missiles cannot be easily adapted to exhibit realistic simulation of afterburning aircraft for the most valid air-to-air missile evaluation programs. Certain proposals have been advanced for producing an infrared output on the target vehicle but heretofore there has been no device which can produce the imaging and controlled output necessary to accurately and realistically simulate an afterburning fighter aircraft. This is required in order to provide a valid test system to evaluate the air-to-air missile being tested.

SUMMARY OF THE INVENTION

The present invention is concerned with providing a low cost powered target using the propulsion engine as the infrared source to exhibit realistic simulation of afterburning aircraft for the most valid air-to-air missile evaluation program. This is accomplished by the injection into various regions of the plume of the target vehicle of a slurried infrared pyrotechnic to produce additive infrared energy in selected amounts in order to shape the radiant intensity pattern to selected types.

The injection and combustion point of the slurry can be adjusted to give a displaced radiation centroid simulating mach stagnation zones in an afterburning exhaust. These can be further adjusted to various displacements to evaluate aim point versus true track point of air-to-air missiles as well as proximity fuze activation and kill radius of the missile warheads.

The device according to the invention includes a slurry tank, a pressurization system, a feeder, and a nozzle assembly. The point of injection and specific configuration of the injection nozzles can be varied to produce the particular radiation intensity pattern which simulates the fighter aircraft with afterburner being used for target purposes.

Accordingly, it is an object of the present invention to provide an infrared simulation device which can be adopted to aerial targetry vehicles to simulate an afterburning aircraft in radiant intensity and infrared images of radiation centroids.

Another object of the invention is to provide a means for converting a pluming infrared source such as a liquid powered target missile rocket engine to create image distribution of radiation centroids to give the infrared equivalent of an afterburning threat aircraft.

Still another object of the invention is to provide an external slurry injection system for use with a liquid fueled rocket target having a large pluming exhaust suitable for utilization in an air-to-air missile system evaluation program.

A further object of the invention is to a system for infrared enhancement of exhaust plumes which is relatively simple in design and which provides for control over fuel rate and additive type of external slurry injection.

A still further object of the invention is to provide an infrared simulation device which enables existing low cost powered targets to be utilized by using the propulsion engine as the infrared source to exhibit realistic simulation of afterburning aircraft for the most valid air-to-air missile evaluation programs.

These and other objects, features and advantages will become more apparent after considering the following detailed description taken in conjunction with the illustrative embodiment in the accompanying drawing wherein like numbers are used throughout to identify like elements.

DESCRIPTION OF THE DRAWINGS

FIG. 1 is a diagrammatic view of the external slurry injection system according to the invention;

FIG. 2 is a typical installation of the slurry injection system on a rocket-powered target missile;

DESCRIPTION OF A PREFERRED EMBODIMENT

Figure 3A:
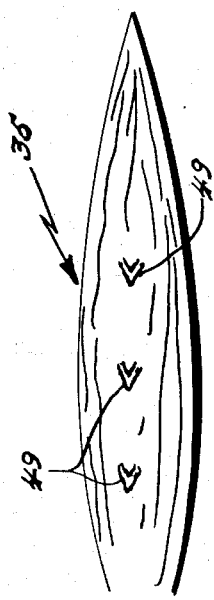
FIG. 3a is a view of a normal engine plume from a rocket-powered target missile.

Referring now to FIG. 1, there is shown a general system diagram of an external slurry injection system according to the invention. In the embodiment shown, a pressurization system includes a tank 13 containing the ram pressure which may be air or some inert gas under pressure. A main valve 15 controls the output of the tank 13 which is then divided into two sections. A portion of the pressurized air serves to pressurize the slurry tank 17 which contains the pyrotechnic injection material. A flow valve 19 and a meter 21 operate to control the pressure in the tank 17. Another portion of the pressurized air passes through the line 23, through the valve 25, and into the atomizing air line 27. A meter 29 serves to indicate the pressure in the atomizing air line 27 during operation of the injector system. The outlet of the slurry tank 17 is operatively connected to a slurry line 31 which terminates at the injector head 33. The atomizing line 27 is connected to the slurry line 31 near the injector head 33.

In the view shown in FIG. 1, the injector head 33 is positioned to release, from a single point in the main engine plume 35, a quantity of atomized slurry 37. This creates an enhanced shock front and can be adjusted to give a displaced radiation centroid for simulating mach stagnation zones in an afterburning exhaust.

In FIG. 2, there is shown a missile centerbody aft section 39 with the slurry injection system attached thereto. The fins 41 are positioned on the rearwardmost section of the centerbody 39 for purposes of control and stabilization. The missile exhaust is emitted from the engine nozzle 43 and it is this exhaust which is to be augmented by the slurry injection system to simulate the afterburning aircraft. The slurry tank 17 along with the other elements of the injection system are positioned within a tunnel fairing 45 attached in spaced relation to the outside surface of the centerbody 39. The ram pressure enters the pressure feed line at 47 and pressurizes the slurry tank 17 to force the slurry through the line 31 toward the injector head 33. The pressurized air in the slurry line is controlled by the flow valve 19 which also serves as a pressure regulator. A second line, not shown in FIG. 2, carries pressurized gas from the line 47 directly to the injector head 33 for the purpose of atomizing the slurry as it enters the main engine nozzle area. This arrangement is shown clearly in FIG. 1.

Figure 3B:
FIG. 3b shows the effect of single point injection of slurry into the engine plume.

In FIGS. 3a, 3b, 3c and 3d, there is shown a series of typical plume configurations. In FIG. 3a, a normal engine plume 35 with no slurry injection is shown. A plurality of normal shock fronts 49 are shown distributed in the plume 35. In FIG. 3b, the plume 35 is shown after pyrotechnic slurry has been injected from a single point. In enhanced shock front 51 appears along with the normal shock fronts 49. The slurry is provided with instant ignition and, as shown in FIG. 3b, the enhanced shock front 51 is located at the forward portion of the plume 35.

Figure 3C:
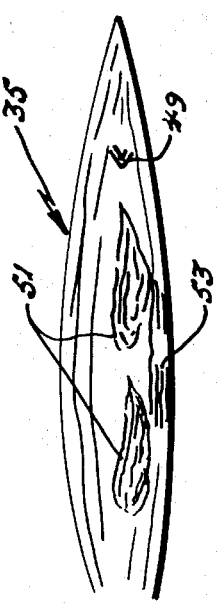
FIG. 3c shows dual point injection and the resulting perturbation of the plume.
Figure 3D:
FIG. 3d shows a plume injection configuration for delayed ignition.

In FIG. 3c, there is shown an example of dual point slurry injection. In this example, there are shown two enhanced shock fronts 51 and a single normal shock front 49. With this type of slurry injection a certain amount of plume perterbation occurs in the area 53. In FIG. 3d, the plume 35 is shown with an example of delayed ignition slurry injection. The enhanced shock front 51 now appears at the rearward portion of the plume 35 with the two normal shock fronts 49 being located in the forward and center portions. The various plume injection configurations shown indicate the versatility of the system in its use for the simulation of an afterburning fighter aircraft by means of a rocket-powered target vehicle.

Figure 4:
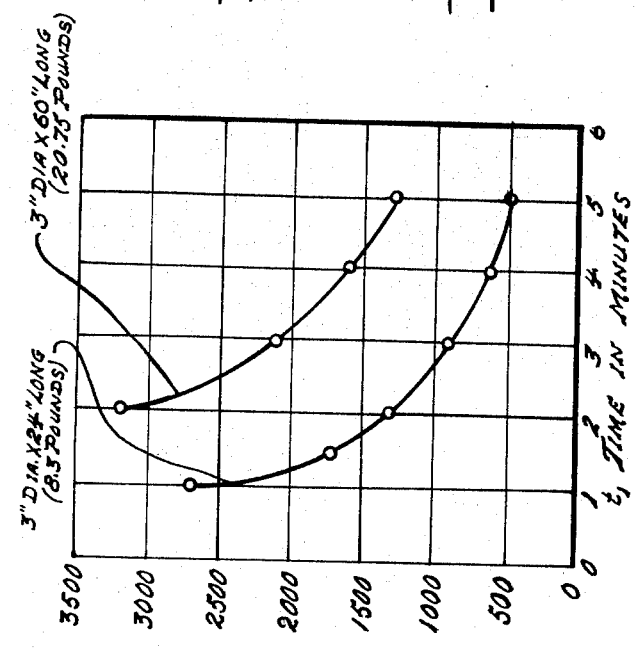
FIG. 4 is a graph of output versus duration for two typical slurry tank sizes, 3 by 60 inches and 3 by 24 inches.

FIG. 4 shows two curves for two sizes of slurry tanks 17 in terms of output and duration assuming efficient injection and not accounting for aerodynamics cooling effects. The curves indicate the properties of a typical pyrotechnic slurry of a chemical composition including heptane, Dow gellant, magnesium and potassium nitrate. This composition has a density of 1.35 grams per cubic centimeter and an ignition temperature of about 2500°C. However, it should be noted that the heptane wetting agent can be started with a match and will in turn ignite the composition. The graviemtric-radiometric efficiency for the composition as indicated in FIG. 4 is on the order of 41 watt-seconds per gram steradian in the 3.9–5.5 micron passband.

MODE OF OPERATION

In operation, it is desired to simulate an afterburning threat fighter aircraft using a rocket-powered target missile. This requires that the engine exhaust of the target missile be augmented in order to more realistically simulate the afterburning aircraft. To accomplish this, the powered target missile must produce an infrared presentation in which the radiant intensity pattern including the imaging of downstream radiation centroids is of particular parameters.

The present invention includes an external means for injecting a pyrotechnic slurry into the exhaust plume 35 of the target vehicle. The slurry tank 17 is filled with the slurried infrared pyrotechnic. Air from the pressure tank 13 pressurizes the slurry tank 17 and forces the material into the slurry line 31. As the slurry nears the injector head 33, air from the tank 13 is fed into the slurry line 31 and controllably atomizes the slurry as it passes by. The atomized slurry passes into the target engine exhaust plume 35 and augments the infrared radiant intensity of the target exhaust. By selectively controlling the ignition time as well as the position and number of injection points, the target vehicle exhaust plume can be altered to accurately and realistically simulate the radiation pattern emitted by an afterburning threat aircraft. This permits existing low cost powered targets to be used to exhibit realistic simulation of afterburning aircraft for the most valid air-to-air missile evaluation programs.

Although the invention has been illustrated in the accompanying drawings and described in the foregoing specification in terms of a preferred embodiment thereof, the invention is not limited to this embodiment or to the preferred configuration mentioned. It will be apparent to those skilled in the art that our invention can be practiced by utilizing other slurried infrared pyrotechnic materials in various amounts and concentrations and still produce an efficient infrared output for target purposes.

Also, it should be understood that various changes, alterations, modifications, and substitutions particularly with respect to the construction details can be made in the arrangement of the several elements without departing from the true spirit and scope of the appended claims.

Having thus described our invention, what we claim and desire to secure by Letters Patent of the United States is:

1. In combination, a rocket-powered target vehicle having a center-body and a tunnel fairing attached in spaced relation to the outside surface thereof and apparatus for enhancing the infrared content of the exhaust plume of said rocket-powered target vehicle by controllably injecting a pyrotechnic slurry into the main exhaust flow thereof, said apparatus comprising a pressure tank source of pressurized gas, a slurry tank positioned within the tunnel fairing for containing a slurried pyrotechnic material, said slurry tank having an input operatively connected to said oressure tank and an output, a slurry line connected to the output of said tank for carrying the pyrotechnic material from said slurry tank to the exhaust plume immediately adjacent the rear of the rocket-powered vehicle, an injector head attached to the outlet of said slurry line, and an atomizing air line connected between said pressure tank and the outlet of said slurry line immediately behind said injector head, thereby controllably atomizing the pyrotechnic slurry as it is being injected into predetermined positions and points within the exhaust plume of the rocket-powered target vehicle.

2. The apparatus defined in claim 1 wherein a plurality of slurry lines each having an injector head attached to its outlet end are positioned to inject slurried infrared pyrotechnic into various portions of the exhaust plume of the rocket-powered target vehicle thereby realistically simulating the radiant intensity pattern of an afterburning aircraft.

3. The apparatus defined in claim 2 wherein the slurried infrared pyrotechnic injected through the injector heads is a composition of the heptane, Dow gellant, magnesium and potassium nitrate and has a gravimetric-radiometric efficiency of 41 watt-seconds per gram steradian in the 3.9–5.5 micron passband.

* * * * *